US008295322B2

(12) United States Patent
Adamkiewicz et al.

(10) Patent No.: US 8,295,322 B2
(45) Date of Patent: Oct. 23, 2012

(54) METHOD FOR FORMING A LASER RESONATOR SO THAT OPTICAL COMPONENTS OF THE LASER RESONATOR ARE ALIGNED

(75) Inventors: Edward Joseph Adamkiewicz, Longwood, FL (US); Carlos Avila, Palm Bay, FL (US)

(73) Assignee: DRS RSTA, Inc., Dallas, TX (US)

( * ) Notice: Subject to any disclaimer, the term of this patent is extended or adjusted under 35 U.S.C. 154(b) by 1141 days.

(21) Appl. No.: 12/122,287

(22) Filed: May 16, 2008

(65) Prior Publication Data

US 2009/0285256 A1    Nov. 19, 2009

(51) Int. Cl.
*H01S 3/08* (2006.01)
(52) U.S. Cl. ......... 372/107; 372/98; 372/100; 372/106
(58) Field of Classification Search ............ 372/98–107
See application file for complete search history.

(56) References Cited

U.S. PATENT DOCUMENTS

| | | | |
|---|---|---|---|
| 3,886,474 A | | 5/1975 | Hensolt et al. |
| 4,037,942 A | * | 7/1977 | Guyer ........................ 359/226.1 |
| 4,245,195 A | * | 1/1981 | Fahlen et al. ................. 372/92 |
| 4,442,524 A | | 4/1984 | Reeder et al. |
| 5,170,409 A | * | 12/1992 | Nightingale et al. ......... 372/107 |
| 5,195,104 A | * | 3/1993 | Geiger et al. ................... 372/97 |
| 5,265,116 A | | 11/1993 | Mooradian |
| 5,530,714 A | * | 6/1996 | Vilhelmsson et al. .......... 372/92 |
| 5,640,412 A | * | 6/1997 | Reed ............................. 372/100 |
| 5,651,022 A | * | 7/1997 | Anthon et al. .................. 372/92 |
| 6,418,250 B1 | * | 7/2002 | Corbosiero et al. ............ 385/24 |
| 6,418,251 B1 | | 7/2002 | Boscha |
| 7,817,704 B2 | | 10/2010 | Seitel |

OTHER PUBLICATIONS

International Search Report corresponding to PCT/US09/41611 dated Jul. 17, 2009.

* cited by examiner

*Primary Examiner* — Eric Bolda
(74) *Attorney, Agent, or Firm* — Kilpatrick Townsend & Stockton LLP

(57) ABSTRACT

A laser resonator and method for forming the laser resonator are provided. The method comprises placing a housing for the laser resonator in an alignment fixture, attaching a bond plate to an optical component of the laser resonator, attaching a first end of an alignment arm to the bond plate attached to the optical component, attaching a second end of the alignment arm to the alignment fixture such that the optical component is disposed over the housing, aligning, via the alignment fixture and the alignment arm, the optical component relative to the housing, and bonding the aligned optical component to the housing. The first end of the alignment arm may removed once the aligned optical component is bonded to the housing.

13 Claims, 11 Drawing Sheets

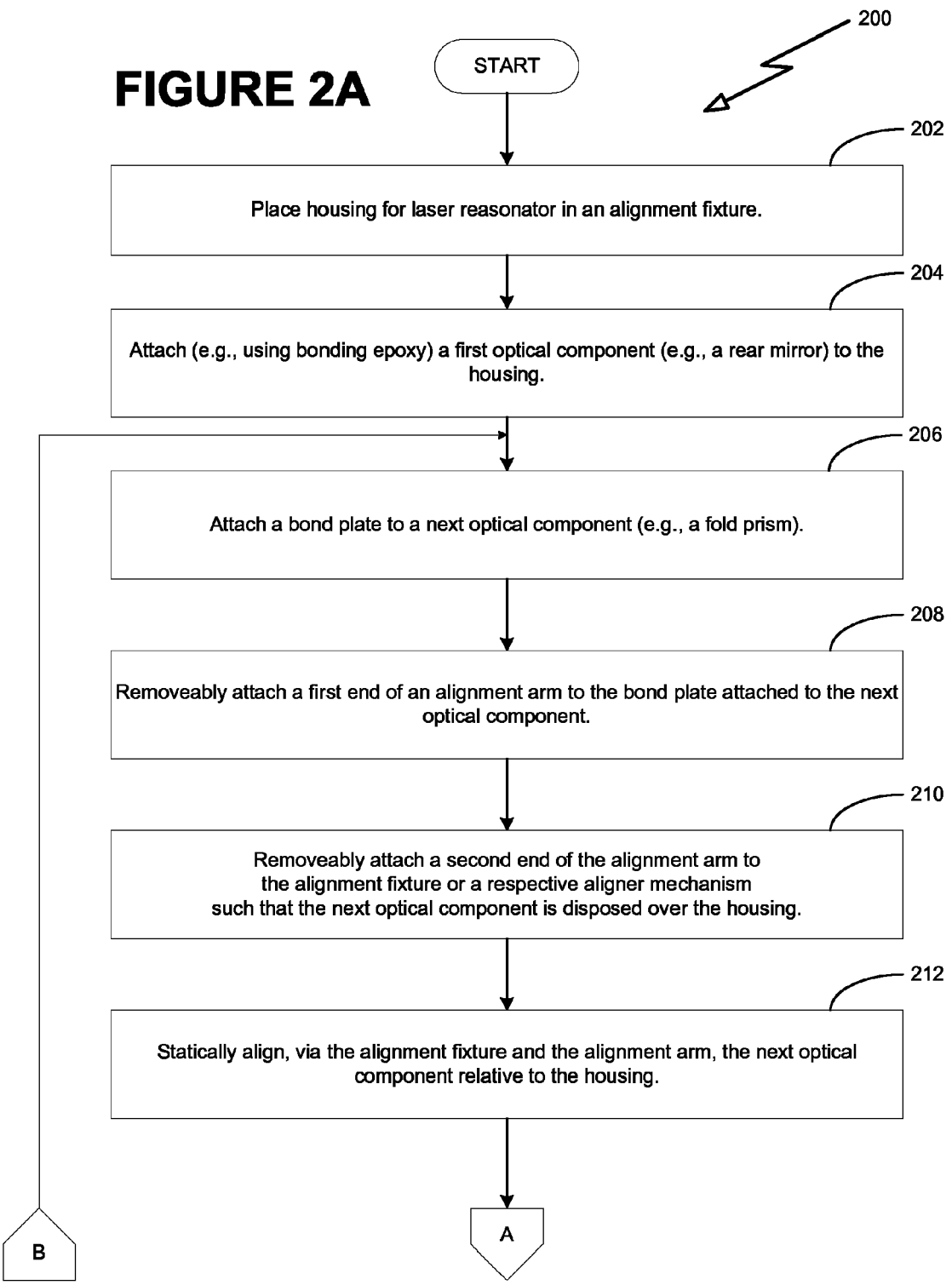

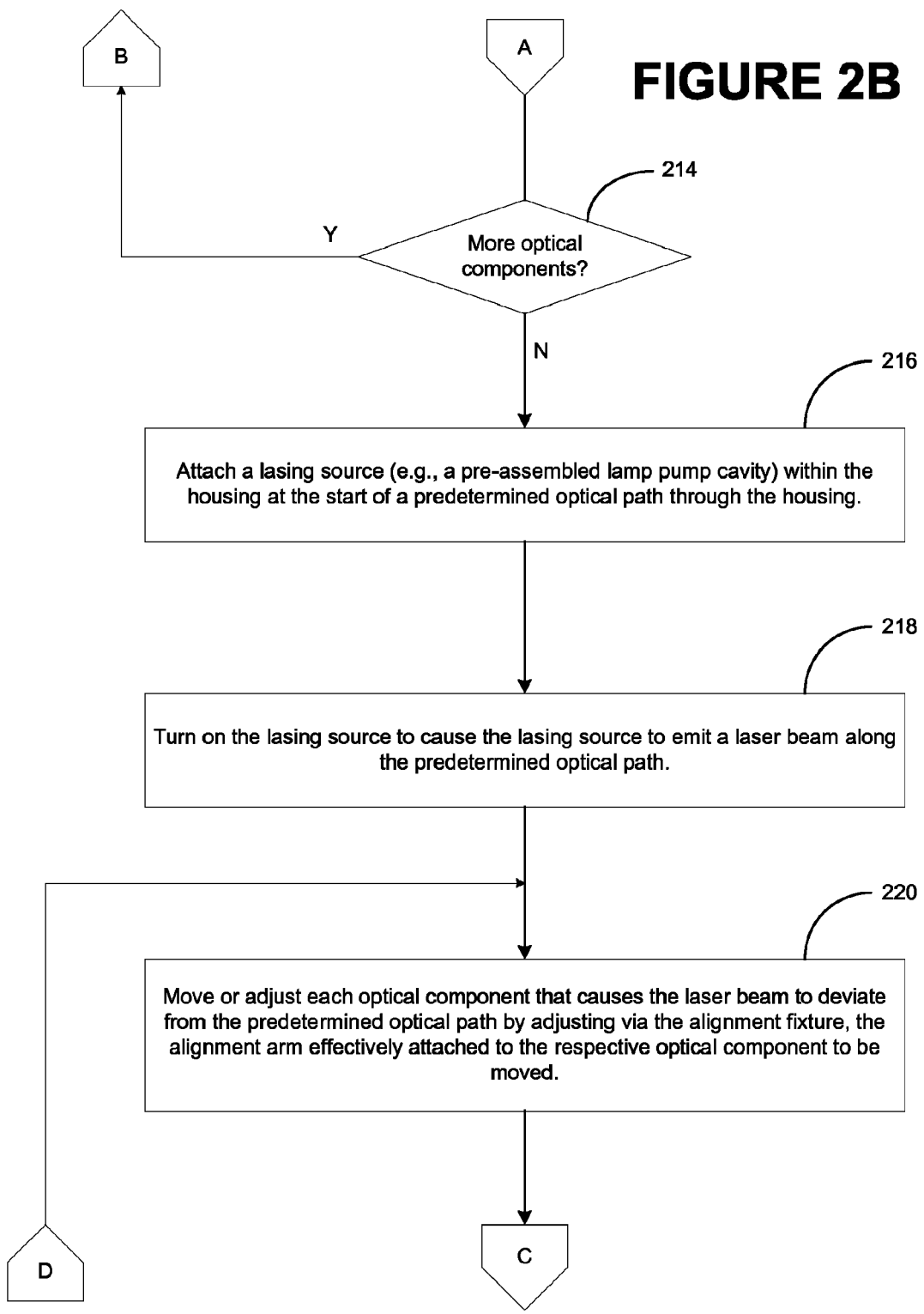

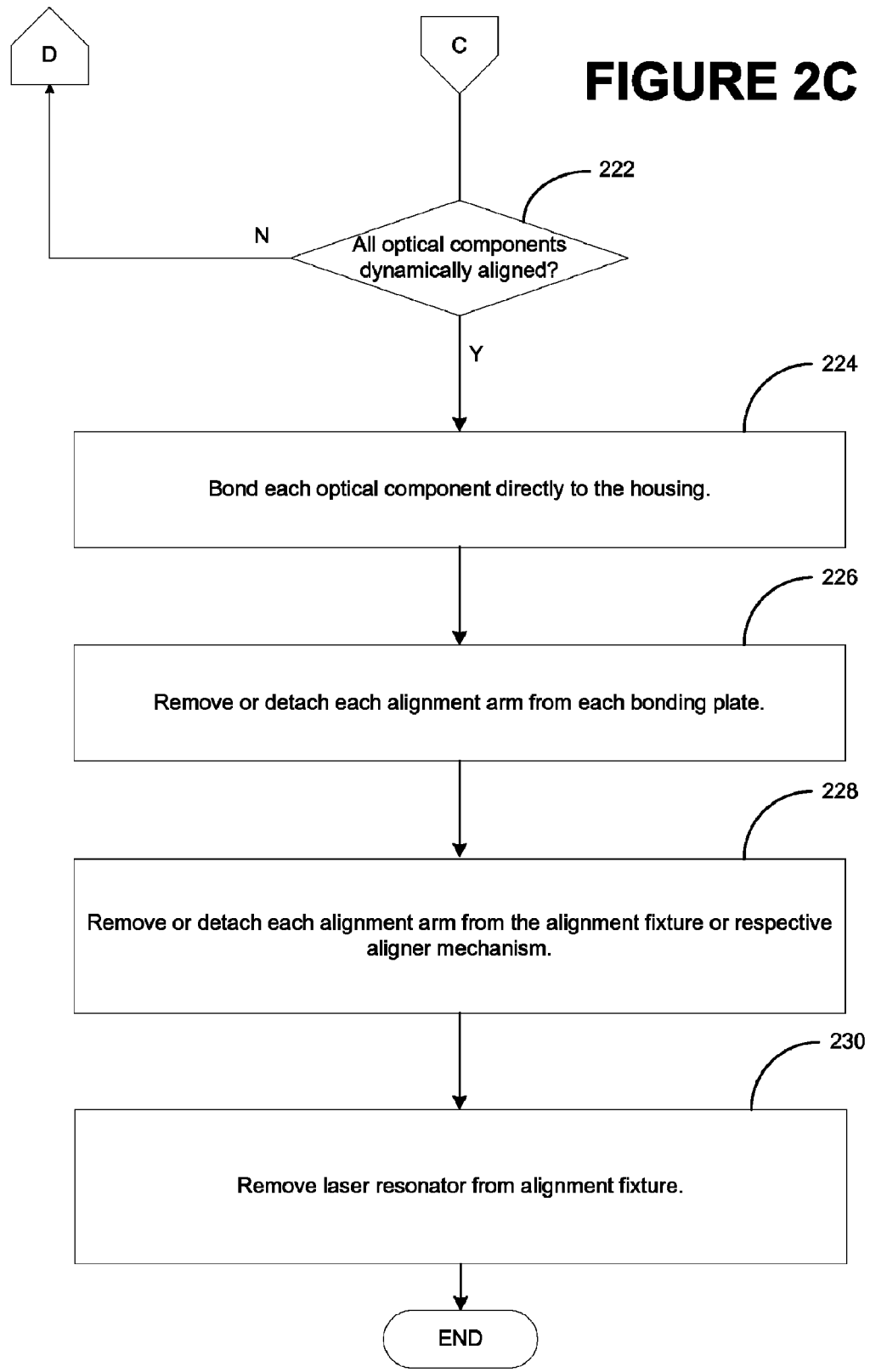

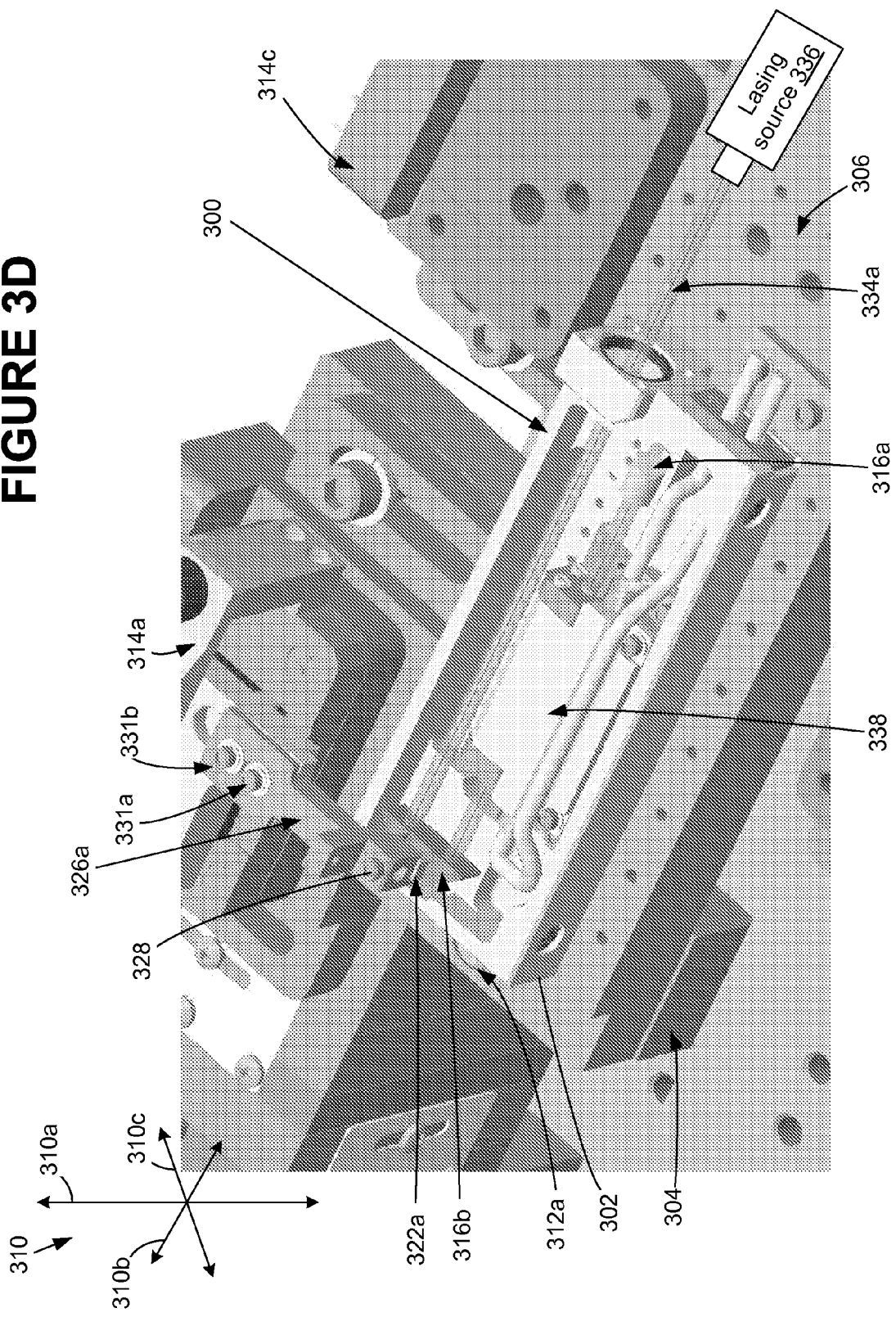

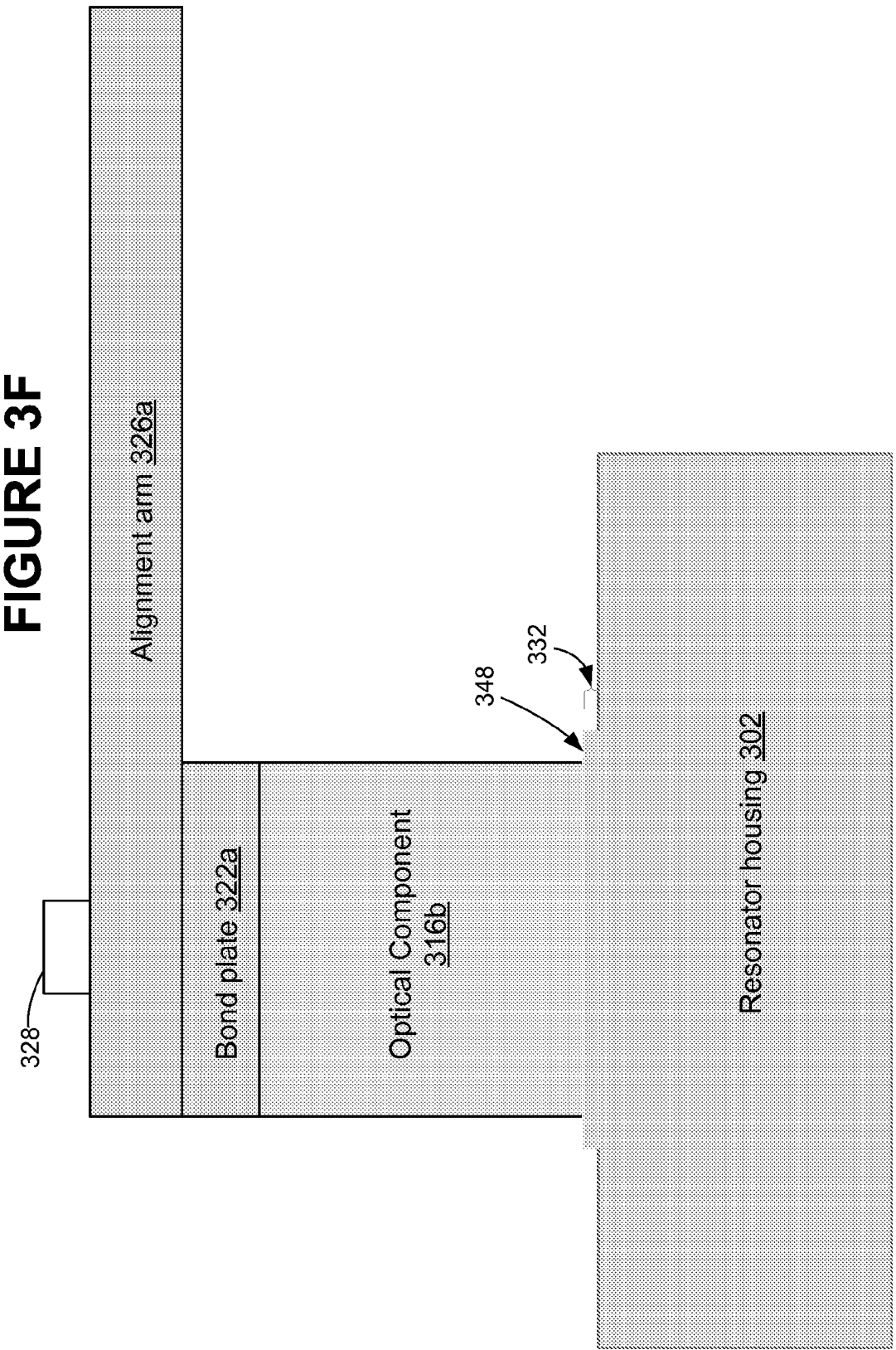

METHOD FOR FORMING A LASER RESONATOR SO THAT OPTICAL COMPONENTS OF THE LASER RESONATOR ARE ALIGNED

BACKGROUND OF THE INVENTION

The present invention relates to laser resonators. More particularly, the present invention relates to a method for forming a laser resonator so that optical components of the laser resonator are aligned and attached to a laser resonator housing or optical bed without using a mechanical mount for each optical component.

FIG. 1 is a perspective view of a conventional laser resonator 10 with a housing cover removed to illustrate the problems in forming such a conventional laser resonator. As shown in FIG. 1, optical components (e.g., rear mirror 12, wave plate 14 and Risley prism pairs 16a-16b, laser pump cavity, lamp, and rod unit 18, q-switch 20, optical parametric oscillator (OPO) mirror 22, OPO crystal 24, and output mirror 26) of a conventional laser resonator 10 are typically mounted to an optical bed 28 using adjustable mechanical mounts 30a-30i. Each mechanical mount 30a-30i is typically screwed to the optical bed 28 and has one or more adjustable screws to align the respective optical component contained by the mechanical mount relative to an optical path through the laser resonator 10. When the optical components are aligned via the mechanical mounts 30a-30i, the optical bed 28 is then attached to a housing (not shown in FIG. 1) for the laser resonator 10. The mechanical mounts 30a-30i occupy space on the optical bed 28 and within the laser resonator 10 housing, limiting the miniaturization of the laser resonator 10, increasing component costs, and increasing cost to manufacture. Implementing the laser resonator 10 using an optical bed 28 also increases component and manufacturing costs.

There is therefore a need for a method for forming a laser resonator that overcomes the problems noted above and enables optical components of the laser resonator to be aligned and mounted to a housing or optical bed without employing a mechanical mount for each optical component.

SUMMARY OF THE INVENTION

In accordance with methods consistent with the present invention, a method is provided for forming a laser resonator. The method comprises placing a housing for the laser resonator in an alignment fixture, attaching a bond plate to an optical component of the laser resonator, attaching a first end of an alignment arm to the bond plate attached to the optical component, attaching a second end of the alignment arm to the alignment fixture such that the optical component is disposed over the housing, aligning, via the alignment fixture and the alignment arm, the optical component relative to the housing, and bonding the aligned optical component to the housing.

In one implementation in which the first end of the alignment arm is removeably attached to the bond plate, the first end of the alignment arm is removed from the bond plate after the aligned optical component is bonded to the housing.

In accordance with methods consistent with the present invention, another method is provided for forming a laser resonator. The laser resonator has a plurality of optical components. The method comprises placing a housing for the laser resonator in an alignment fixture, attaching each of the optical components to a respective one of a plurality of bond plates, attaching a first end of each of a plurality of alignment arms to a corresponding one of the bond plates, attaching a second end of each alignment arm to the alignment fixture such that each optical component is disposed over the housing, aligning, via the alignment fixture and the alignment arms, each of the optical components relative to the housing, and bonding each aligned optical component to the housing.

In one implementation, the method further comprises disposing a lasing source within the housing at the start of a predetermined optical path through the housing. Each of the optical components are disposed along the predetermined optical path. In this implementation, the step of aligning comprises turning on the lasing source to cause the lasing source to project a laser beam along the predetermined optical path, and moving each optical component that causes the laser beam to deviate from the predetermined optical path by adjusting, via the alignment fixture, the alignment arm effectively attached to the respective optical component to be moved.

In accordance with articles of manufacture consistent with the present invention, a laser resonator is provided. The laser resonator has a housing, a plurality of optical components, and a plurality of plates. Each plate is affixed to a respective one of the optical components and adapted to be removeably attached to a respective alignment arm of an alignment fixture so that the optical components are aligned with each other to define an optical path through the laser resonator. Each of the optical components are directly bonded to the housing relative to the plate affixed to the respective optical component such that the optical components collectively maintain the optical path through the laser resonator.

Other methods, systems, features, and advantages of the present invention will be or will become apparent to one with skill in the art upon examination of the following figures and detailed description. It is intended that all such additional methods, systems, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings:

FIGS. 2A-2C collectively show a flow chart depicting a process for forming or manufacturing a laser resonator in accordance with the present invention so that optical components of the laser resonator are aligned relative to an optical path through the laser resonator without employing mechanical mounts for the components;

FIGS. 3A, 3D, 3E and 3G each show a perspective view of an alignment fixture and an exemplary laser resonator disposed in relation to the alignment fixture and manufactured in accordance with the process depicted in FIGS. 2A-2C, where the alignment fixture and the laser resonator are illustrated at various steps of the manufacturing process;

FIG. 3F is a cross-sectional block diagram view of the optical component in FIG. 3C bonded to a housing of the resonator in accordance with the process depicted in FIGS. 2A-2C.

DETAILED DESCRIPTION OF THE INVENTION

Reference will now be made in detail to an implementation in accordance with methods, systems, and products consistent with the present invention as illustrated in the accompanying drawings.

Figure 1:
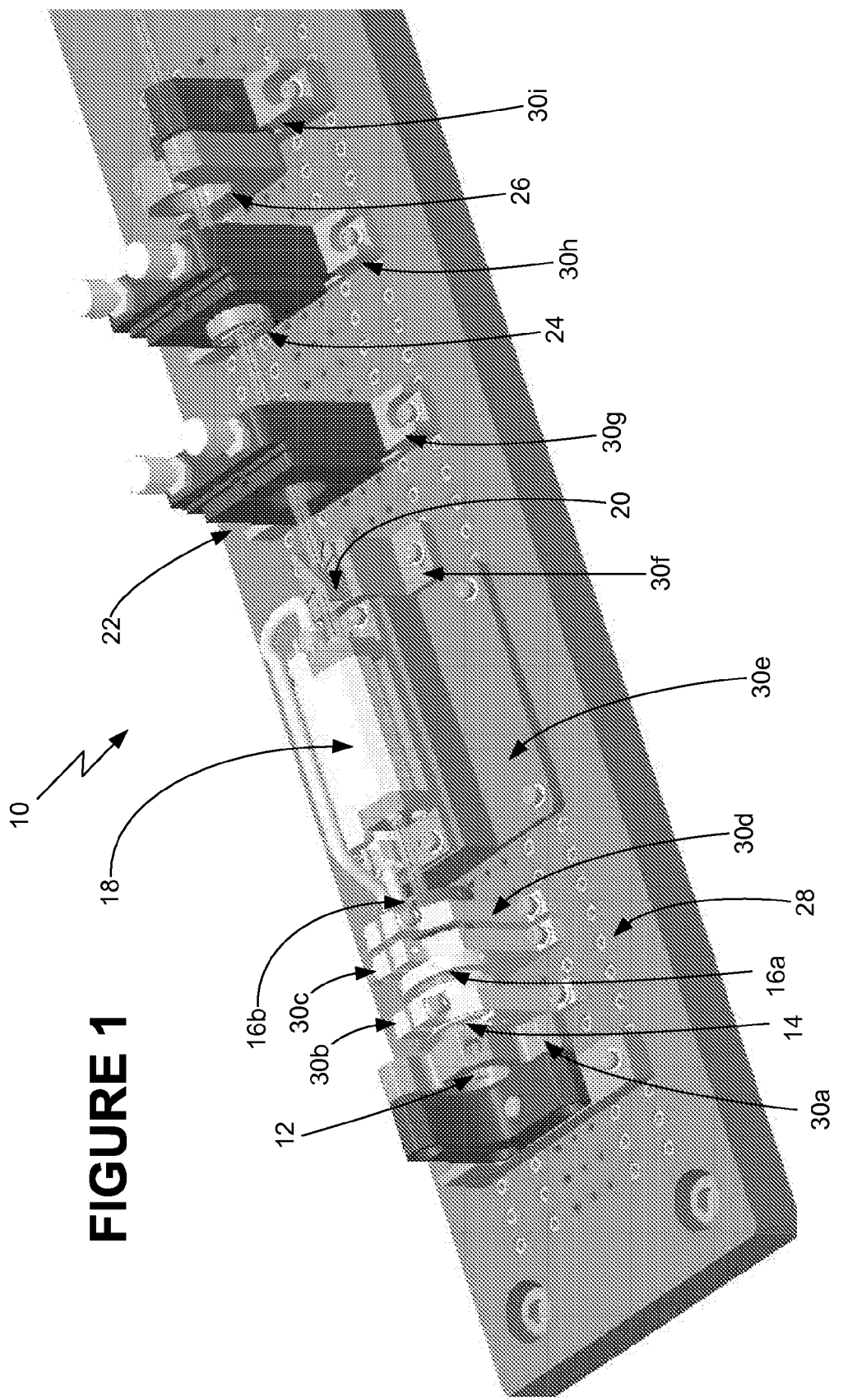
FIG. 1 is a perspective view of a conventional laser resonator with a housing cover removed to illustrate the problems in forming such a conventional laser resonator.
Figure 3A:
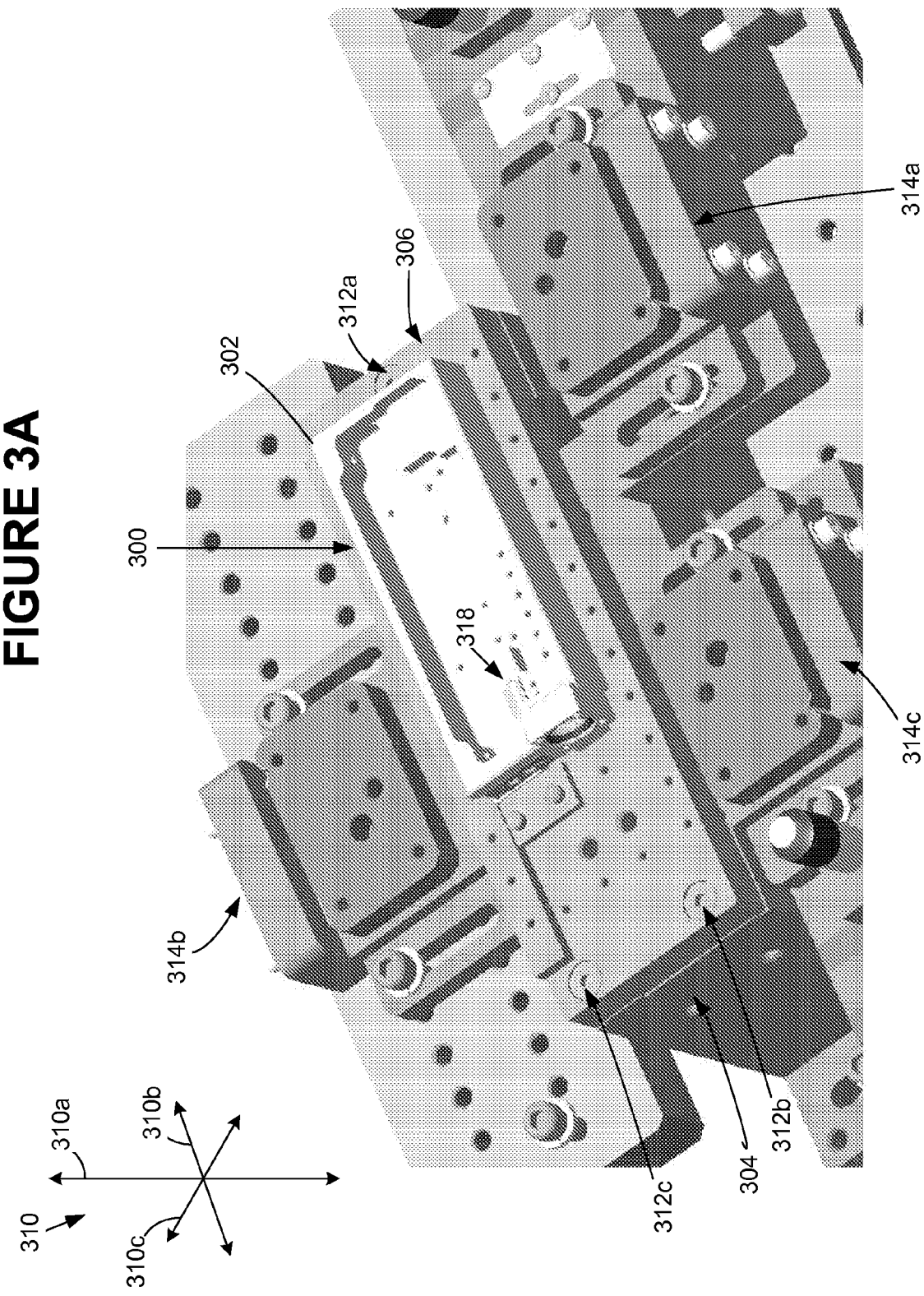

The flow chart shown in FIGS. 2A-2C depicts a process 200 for forming or manufacturing a laser resonator 300 so that optical components of the laser resonator are aligned relative to an optical path through the laser resonator without employing mechanical mounts for the optical components. Initially, a housing 302 for a laser resonator 300 is placed in an alignment fixture 304 (step 202) as shown in FIG. 3A. The housing 302 is illustrated without a cover and having a rectangular shape. However, the housing 302 may have a square, circular, or other shape without departing from the scope of the present invention. The housing 302 is preferably comprised of a lightweight material, such as Titanium or Aluminum, that may hold its shape under operating conditions and environment in which the resonator 300 is to be used.

In the implementation shown in FIG. 3A, the alignment fixture 304 has a leveling plate 306 upon which the housing 302 is temporarily affixed or secured via screws (not shown in the figures). The leveling plate 306 is leveled relative to a coordinate system 310 defined by a z-axis 310a, a y-axis 310b, and a x-axis 310c of the alignment fixture 304. The leveling plate 306 may be leveled relative to the coordinate system 310 using a plurality of screws 312a-312c that adjustable attach the leveling plate 306 to the alignment fixture 304. Thus, the coordinate system 310 corresponds to or reflects a coordinate system of the housing 302.

The alignment fixture 304 has one or more aligner mechanisms 314a-314c that may be disposed on either side of the leveling plate 306 or disposed about the housing 302. As discussed in further detail herein, each aligner mechanism 314a-314c is attached to one end of a respective alignment arm and an optical component of the laser resonator 300 is effectively attached to another end of the same alignment arm. Each aligner mechanism 314a-314c is operatively configured to position or tilt the respective alignment arm and, thus, the optical component attached to another end of the respective alignment arm in at least one axis 314a, 310b, or 310c relative to the housing 302 so that the optical component may be aligned and bonded directly to the housing 302 without employing a mechanical mount for the optical component. Each aligner mechanisms 314a-314c may be a 4 axis tilt aligner commercially available from New Focus (a Division of Bookham, Inc.) or another aligner operatively capable of moving an alignment arm in at least one direction along an axis or tilting the alignment arm in at least one axis corresponding to axis 310a, 310b, or 310c of the housing 302.

Figure 3B:
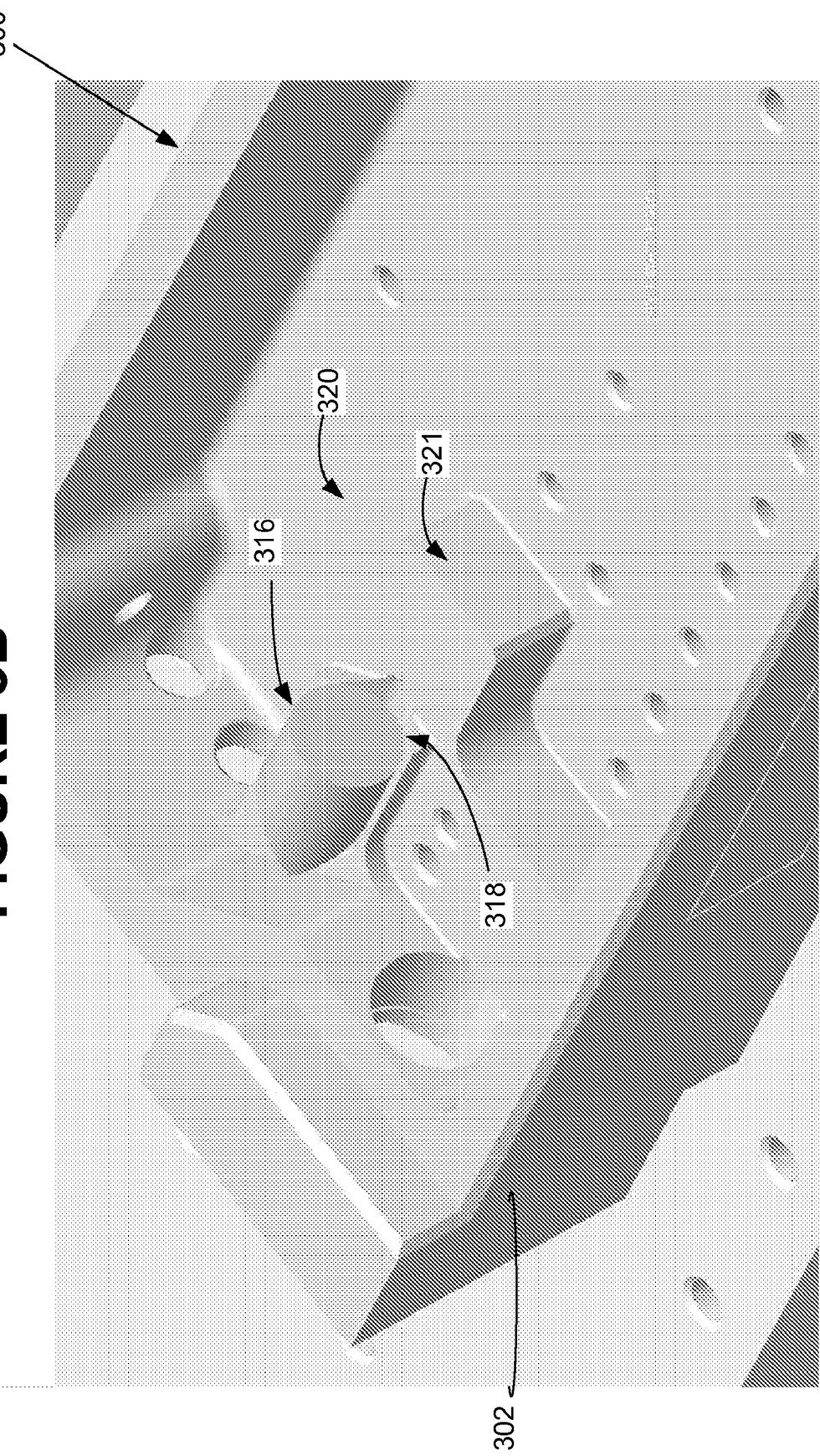
FIG. 3B depicts an enlarged view of one embodiment of the laser resonator in which a recess is etched into a bottom of the laser resonator housing and a first optical component is positioned in the recess to self-align the first optical component to the laser resonator housing.

Returning to FIG. 2A, after the housing 302 is placed in the alignment fixture 304, a first optical component 316a (e.g., a rear mirror or Porro prism shown in FIG. 3B) is attached directly to the housing 302 (step 204). The first optical component 316 may be attached to the housing 302 using, for example, a UV epoxy or cement such as UV-61. In this implementation, the first optical component 316a is assumed to have cylindrical shape or other shape that may be self-aligned relative to the housing 302 via a recess 318 (shown best in FIGS. 3A and 3B), such as a "V" groove, that is pre-etched in the bottom 320 (or in a mesa 321 extending from the bottom 320) of the housing 302 to receive and hold the first optical component 316. However, the first optical component 316a may be aligned and bonded to the housing 302 in the same manner as discussed herein for the remaining optical components 316b-316e.

Figure 3C:
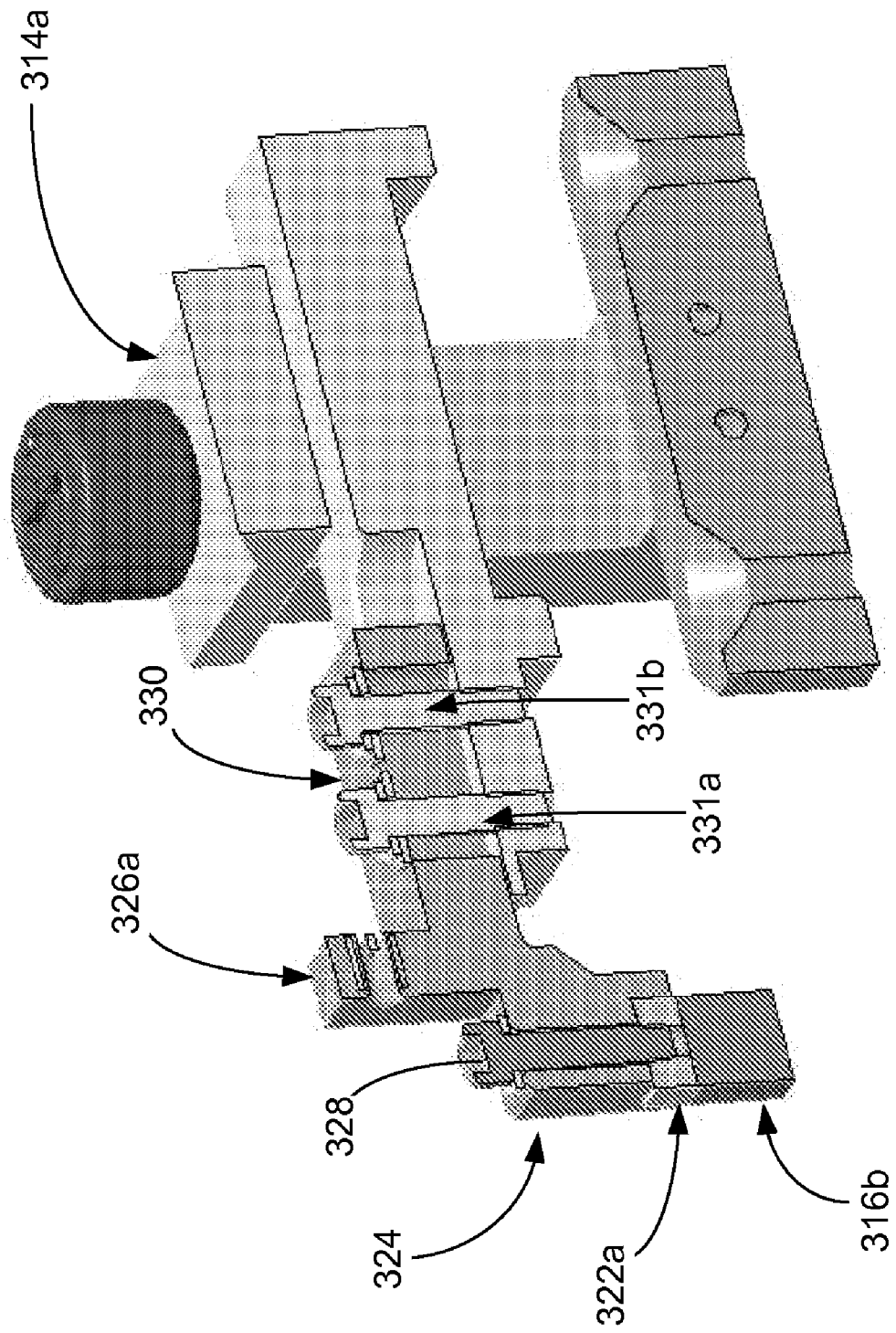
FIG. 3C is a cross-sectional view of an optical component of the laser resonator that is removeably attached, via a bonding plate, to an alignment arm of the alignment fixture in accordance with the process depicted in FIGS. 2A-2C.

Next, a bond plate 322a is attached to a next optical component 316b (e.g., a fold prism or mirror) of the laser resonator 300 (step 206) and a first end 324 of an alignment arm 326a is removeably attached to the bond plate 322a (step 208) as illustrated, for example, in FIG. 3C. The bond plate 322a may be comprised of a lightweight material, such as aluminum or titanium, that is capable of being bonded to the optical component 316b so that the optical component 316b may be held in place over the housing 302 when the bond plate 322a is removeably attached to the alignment arm 326a. In one implementation, the bond plate 322a is attached to the next optical component 316b using an epoxy material such as UV-61.

In one implementation, the bond plate 322a is removeably attached to the first end 324 of the alignment arm 326a via a fastener, such as a screw 328. In this implementation, the bond plate 322a has a threaded recess for receiving and engaging the screw 328 when inserted through an opening in the first end 324 of the alignment arm 326a.

A second end 330 of the alignment arm 326a is attached to the alignment fixture 304 or one of the aligner mechanisms (e.g., 314a) such that the optical component 316b is disposed over the housing 302 (step 210) as shown, for example, in FIGS. 3C and 3D. When the alignment arm 326a is attached between the alignment fixture 304 (or the aligner mechanism 314a) and the bond plate 322a, the optical component 316b defines a gap 332 (as shown in Figure F) between the optical component 316b and the housing 302. As discussed in further detail below, the gap 332 may be adjusted in response to aligning the optical component 316b by moving or tilting the alignment arm 326a via the alignment fixture 304 or the respective aligner mechanism 314a to which the alignment arm 326a is attached. When alignment of the optical component 316b is completed in accordance with the present invention, the gap 322 between the optical component 316b and the housing 302 may have a non-symmetrical thickness.

In one implementation, the second end 330 of the alignment arm 326a is removeably or pivotally attached to the alignment fixture 304 or the aligner mechanism 314a (e.g., via screws 331a or 331b or other fasteners) so that the alignment arm 326a may be detached or moved away from the housing 302, enabling the laser resonator 300 to be removed from the alignment fixture 304 after completion of the process 200. Note the process steps of attaching the bond plate 322a to the optical component 316b, attaching the bond plate 322a to the alignment arm 326, and attaching the alignment arm 326 to the alignment fixture 304 or the aligner mechanism 314a may be completed in any order without departing from the scope of the present invention.

Continuing with FIG. 2A, after the optical component 316b is effectively attached to the alignment fixture 304 or the aligner mechanism 314a via the bonding plate 322a and the alignment arm 326 so that the optical component 316b is disposed over the housing 302, the optical component 316b is statically aligned via the alignment fixture 304 or the aligner mechanism 314a (step 212). In one implementation depicted in FIG. 3D, statically aligning comprises reflecting a laser beam 334a from a lasing source 336 off of the optical component 316b, determining whether the reflected laser beam 334b deviates from a predetermined path (e.g., a path corresponding to a chief ray of the laser beam 334a incident upon the optical component 316b), and, in response to determining the reflected laser beam 334b deviates from the predetermined path, adjusting the optical component 316b via the aligner mechanism 314a of the alignment fixture 304 and the alignment arm 326a that is effectively attached to the optical component 316b. Although the lasing source 336 is shown external to the laser resonator housing 302 for static alignment of the optical component 316b, the lasing source 336 for static alignment may be a lasing source 338 (e.g., a pre-assembled lamp pump cavity) that is an internal component of the laser resonator 300 as discussed in further detail below.

Turning to FIG. 2B, a person or machine (not shown in the figures) performing the process 200 may determine whether there are more optical components to be installed in the laser resonator 300 (step 214). Although a machine for performing the process 200 is not shown in the figures, it would be apparent to one of ordinary skill in the art having reviewed the present application that a machine may be implemented using, for example, a computer based robotic system programmed to automatically perform the process 200. Such a machine may include the lasing source 336, have a photo eye for detecting a reflected laser beam 334b, and robotic arms with fingers adapted to form, manufacturer or assemble the resonator 300 in accordance with the process 200.

Figure 3E:
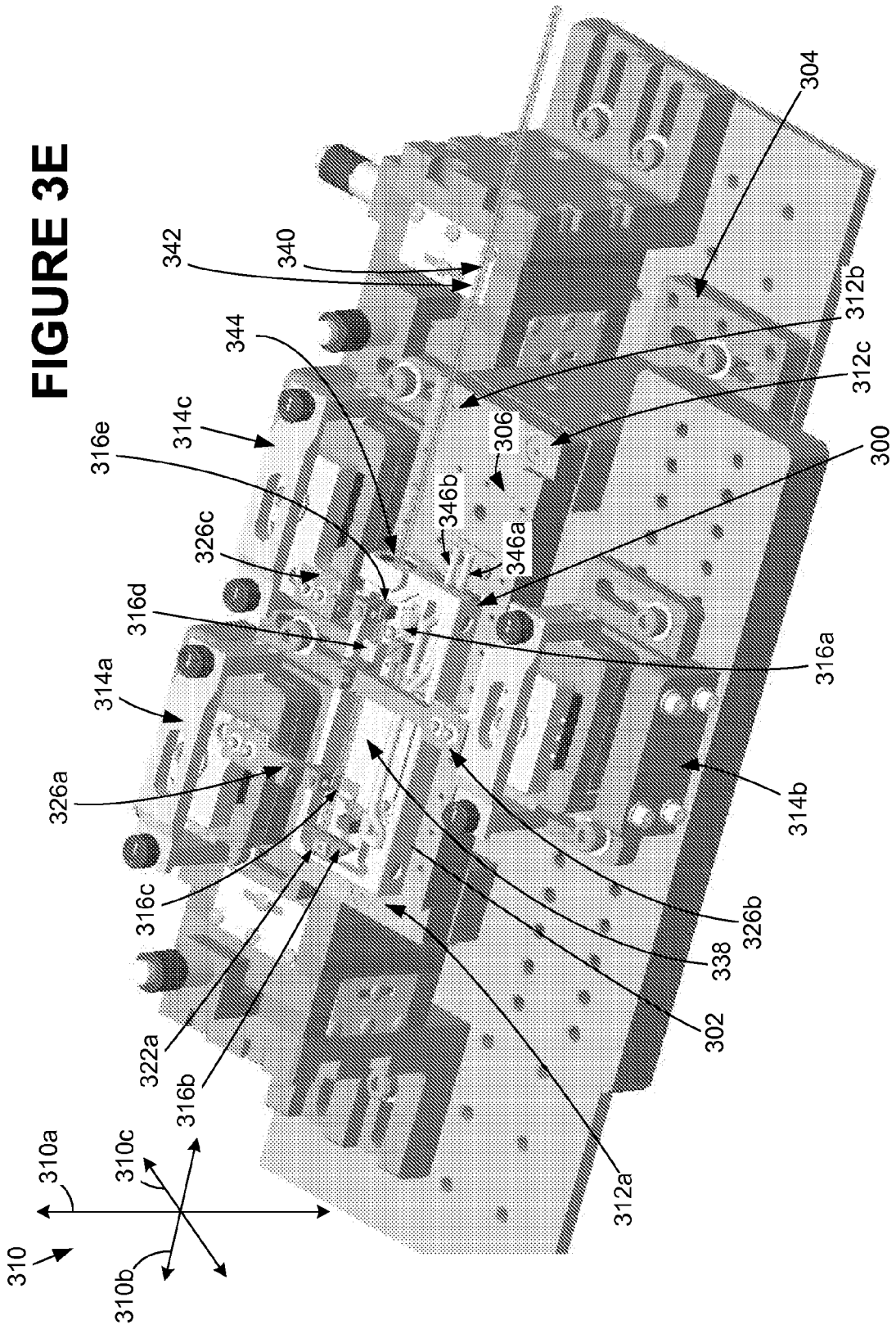

As shown in the implementation in FIG. 3E, after the next optical component 316b is statically aligned to the laser resonator housing 302 as described above and if the optical component 316b does not require being dynamically aligned with the other optical components 316c-316e as further described below, the optical component 316b may be bonded to the housing as discussed in reference to step 224 of process 200 herein. In the implementation shown in FIG. 3E, the next optical component 316b is a folding prism that may be bonded after being statically aligned with the laser resonator housing 302 without being dynamically aligned with the other optical components 316c-316e. In addition, after the next optical component 316b is statically aligned and bonded to the housing 302, the alignment arm 326a may be removed from the bonding plate 322a that is attached to the optical component 316b. The alignment arm 326a and the alignment mechanism 314a may then be used to install the subsequent or next optical component 316c as shown in FIG. 3E.

Returning to FIG. 2B, if there are more optical components to be installed in the laser resonator 300 after installing the optical component 316b, the person or machine may continue processing at step 206. Accordingly, by performing the process 200, each optical component 316b-316e that is not self-aligned (or at least each of those optical components 316c-316e as shown in FIG. 3E that require dynamic alignment relative to each other) is attached to a respective bond plate 322b-322d, each bond plate 322b-322d is removeably attached to a first end 324 of a corresponding one of a plurality of alignment arms 326a-326c, the second end 330 of each alignment arm 326a-326c is removeably attached to a respective aligner mechanism 314a-314c of the alignment fixture 304 such that each optical component 316c-316e to be dynamically aligned is disposed over the housing 302 as shown in FIG. 3E such that each optical component 316c-316e defines a respective gap 332 between the optical component 316c-316e and the housing 302. In addition, by performing the process 200 through step 214, each of the optical components 316a-316e of the laser resonator 300 is statically aligned relative to the housing 302, either via a self-aligning mechanism such as the pre-etched recess 318 in the housing 302 or via a respective aligner mechanism 314a-314c of the alignment fixture 304 adjusting the respective alignment arm 326a-326c as discussed herein.

Continuing with FIG. 2B, if there are no more optical components 316c-316e to be installed in the laser resonator 300, a lasing source 338 (e.g., a pre-assembled lamp pump cavity) is attached or installed within the housing 302 at the start of a predetermined optical path 340 through the housing 302 (step 216). As shown in FIG. 3E, each of the optical components 316a-316e is disposed along the predetermined optical path 340.

Note the lasing source 338 may be attached or installed in alternate sequence with the optical components 316a-316e. For example, when the lasing source 338 is a laser lamp pump cavity requiring a rear mirror as the first optical component, the lasing source 338 may be attached or installed after the first optical component 316a and before the remaining optical components 316c in sequence with where the components 316a-316e and 338 are in the predetermined optical path 340. In addition, the resonator 300 may include other components, such as electrical power supply, a Q-switch, a polarizer, and return cables 346a and 346b for the lasing source 338, which are not described in detail to avoid obscuring the present invention.

After the lasing source 338 is attached or installed in the housing 302, the lasing source 338 is turned on, causing the lasing source 338 to emit a laser beam 342 along the predetermined optical path 340 for output through an exit pupil 344 of the laser resonator 300 (step 218). Each optical component 316c-316e that causes the laser beam 342 to deviate from the predetermined optical path 340 is moved or tilted by adjusting (via the respective aligner mechanism 314a-314c of the alignment fixture 304) the alignment arm 326a-326c that is effectively attached to the respective optical component 316c-316e to be moved (step 220).

Turning to FIG. 2C, the person or machine performing the process 200 next determines whether all the optical components 316c-316e have collectively been dynamically aligned (step 222). In one implementation, the optical components 316c-316e may be deemed dynamically aligned by determining whether the laser beam 342 existing the exit pupil 344 is aligned with a respective axis 310a, 310b, or 310c of the coordinate system 310 of the housing, and/or by measuring the output energy of the laser beam 342 to ensure the output energy is within a predetermined range that reflects the optical components 316a-316e are effectively in alignment with the predetermined optical path 340.

If the optical components 316c-316e are not dynamically aligned, processing continues at step 220 to re-adjust, via the respective aligner mechanism 314a-314c, the optical components 316c-316e that may be causing the laser beam 342 to deviate from the predetermined optical path 340.

If the optical components 316c-316e are dynamically aligned, each optical component 316c-316e is then directly bonded to the housing 302 (step 224). As shown in FIG. 3F, each optical component 316c-316e may be bonded to the housing 302 using a epoxy, cement, or other bonding material 348 that sets quickly so that the alignment of the respective optical component 316c-316e to the housing 302 may be maintained when the alignment arm 326a-326c is removed from the bond plate 322b-322d attached to the respective optical component 316c-316e. The bonding material 348 may be, for example, a UV activated epoxy, such as UV-61. In the implementation shown in FIG. 3E, at least a portion of the gap 332 between the respective optical component 316c-316e and the housing 302 is filled with the bonding material 348 such that the optical component 316c-316e remains in fixed alignment with the housing 302 after the first end 324 of the alignment arm 314a-214c is removed from the bond plate 322b-322d.

After each optical component 316a-316e is bonded to the housing 302, the respective alignment arm 326a-326c is removed or detached from the bonding plate 322a-322d to which the respective optical component 316a-316e is attached. (step 226). In the implementation shown in FIG. 3F, the fastener or screw 328 attaching a respective alignment arm 326a-326c is removed from the respective bonding plate 322a-322d.

Figure 3G:
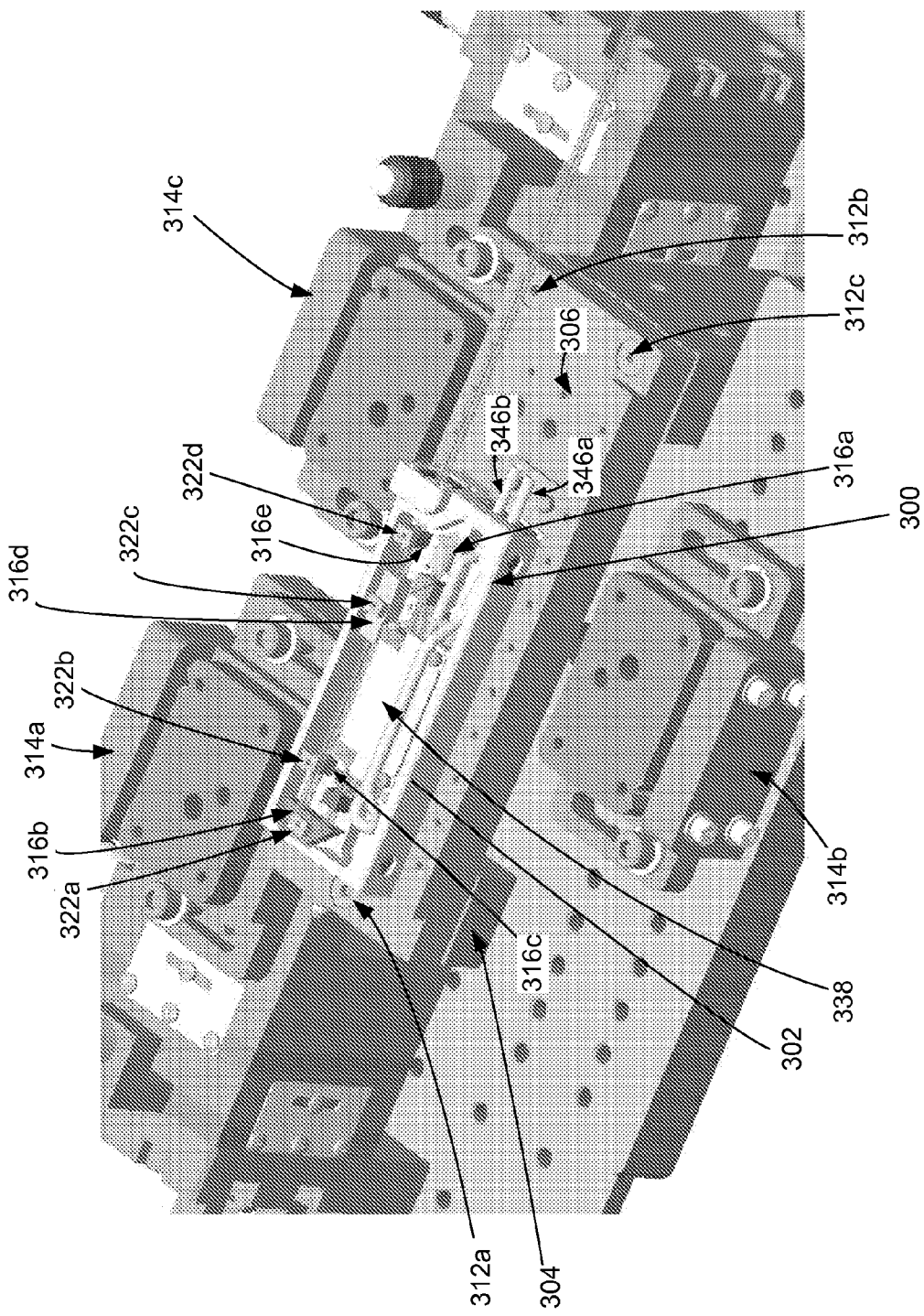

In one implementation, each alignment arm 326a-326c is also removed or detached from the alignment fixture 304 or the respective aligner mechanism 314a-314c (step 328) as shown in FIG. 3G and the laser resonator 300 is removed from the alignment fixture (step 230) before ending processing. In the implementation in which an alignment arm 326a-326c is pivotally attached to the aligner mechanism 314a-314c, step 228 of the process 200 may comprise pivoting the alignment arm 326a-326c away from the housing 302 so that the resonator 300 may be removed from the fixture 304. In addition, a cover (not shown in the figures) may be attached to the open end of the laser resonator 300 to seal the laser components 316a-316e in the laser resonator 300.

Thus, since the optical components 316a-316e of the resonator 300 are directly bonded to the housing 302 in accordance with the present invention, the resonator 300 may be formed or manufactured without employing a separate optical bed or mechanical mounts for aligning and attaching the optical components to the optical bed. As a result, implementing the present invention for forming a laser resonator, significantly decreases component costs and manufacturing costs as well as enables the laser resonator to be miniaturized to a size smaller than conventional laser resonators.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A laser resonator, comprising:
   an optical cavity that includes an optically pumped gain medium; and
   a plurality of optical components,
   wherein the laser resonator forms a sealed housing for the plurality of optical components,
   wherein each of the optical components is aligned and directly bonded to the housing formed by the laser resonator,
   wherein at least one of the plurality of optical components is attached to a bond plate, and
   wherein the bond plate is adapted to be removeably attached to a first end of an alignment arm.

2. The laser resonator of claim 1, wherein the bond plate is adapted to be bonded to the optical component using an epoxy material.

3. The laser resonator of claim 2, wherein the bond plate is adapted to be removeably attached to the first end of the alignment arm via a fastener.

4. The laser resonator of claim 1, wherein:
   a bonding material bonds the optical component to the housing such that the optical component remains in fixed alignment with the housing after the first end of the alignment arm is removed from the bond plate.

5. The laser resonator of claim 4, wherein the bonding material is a UV epoxy.

6. The laser resonator of claim 4, wherein an alignment fixture is operatively configured to selectively move the alignment arm such that the optical component is moved in at least one direction relative to the housing before the aligned optical component is bonded to the housing.

7. The laser resonator of claim 6,
   wherein the alignment fixture has a plurality of aligner mechanisms,
   wherein each of the aligner mechanisms is attached to a respective alignment arm, and
   wherein each of the aligner mechanisms is adapted to selectively tilt the alignment arm attached to the aligner mechanism relative to a plurality of axes associated with the housing.

8. The laser resonator of claim 1, wherein the plurality of optical components includes a Porro prism.

9. The laser resonator of claim 1, wherein the plurality of optical components includes a Q-switch.

10. The laser resonator of claim 1, wherein the plurality of optical components includes a polarizer.

11. The laser resonator of claim 1, wherein the plurality of optical components includes a folding prism.

12. The laser resonator of claim 1, wherein the plurality of optical components includes an output mirror.

13. The laser resonator of claim 1, wherein the plurality of optical components includes an optical parametric oscillator (OPO).

* * * * *